US007881430B2

(12) United States Patent
Coombs

(10) Patent No.: US 7,881,430 B2
(45) Date of Patent: Feb. 1, 2011

(54) AUTOMATIC BUS MANAGEMENT

(75) Inventor: Kevin Andrew Coombs, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 369 days.

(21) Appl. No.: 11/495,839

(22) Filed: Jul. 28, 2006

(65) Prior Publication Data
US 2008/0024161 A1 Jan. 31, 2008

(51) Int. Cl.
*G01N 23/04* (2006.01)
(52) U.S. Cl. .......................................... 378/62; 326/30
(58) Field of Classification Search .................... 326/30, 326/86, 27, 26; 378/62; 327/170
See application file for complete search history.

(56) References Cited

U.S. PATENT DOCUMENTS

| 5,117,129 | A |   | 5/1992  | Hoffman et al. ............. 307/443 |
|-----------|---|---|---------|-------------------------------------|
| 5,442,305 | A | * | 8/1995  | Martin et al. ................... 326/30 |
| 5,583,448 | A | * | 12/1996 | Corder et al. ................... 326/30 |
| 5,585,603 | A | * | 12/1996 | Vogeley, Jr. ............... 177/25.13 |
| 5,682,392 | A |   | 10/1997 | Raymond et al. ........... 371/22.3 |
| 5,796,260 | A |   | 8/1998  | Agan .......................... 324/537 |
| 5,802,390 | A | * | 9/1998  | Kashiwagi et al. ............. 710/1 |
| 5,977,775 | A |   | 11/1999 | Chandler et al. ............. 324/537 |
| 6,205,496 | B1 | * | 3/2001  | Dearden et al. ................. 710/8 |
| 6,275,962 | B1 |   | 8/2001  | Fuller et al. .................. 714/724 |
| 6,324,485 | B1 |   | 11/2001 | Ellis ........................... 702/117 |
| 6,365,859 | B1 |   | 4/2002  | Yi et al. ....................... 209/573 |
| 6,396,279 | B1 |   | 5/2002  | Gruenert ..................... 324/424 |
| 6,397,286 | B1 | * | 5/2002  | Chatenever et al. .......... 710/302 |
| 6,397,361 | B1 |   | 5/2002  | Saitoh ......................... 714/724 |
| 6,448,865 | B1 |   | 9/2002  | Miller .......................... 333/33 |
| 6,538,951 | B1 | * | 3/2003  | Janzen et al. ........... 365/230.03 |
| 6,556,938 | B1 |   | 4/2003  | Rohrbaugh et al. ......... 702/117 |
| 6,577,980 | B1 |   | 6/2003  | Shepston et al. ............ 702/117 |
| 6,587,968 | B1 | * | 7/2003  | Leyva ........................... 714/43 |
| 6,658,613 | B2 |   | 12/2003 | Rearick et al. .............. 714/724 |
| 6,781,405 | B2 | * | 8/2004  | Rajan et al. .................... 326/30 |
| 6,922,073 | B2 | * | 7/2005  | Haase et al. ................... 326/27 |
| 7,046,033 | B2 | * | 5/2006  | McCollum et al. ............ 326/30 |
| 7,142,461 | B2 | * | 11/2006 | Janzen ..................... 365/189.14 |
| 7,312,628 | B2 | * | 12/2007 | Houston et al. ................ 326/30 |
| 7,567,105 | B2 | * | 7/2009  | Trichy et al. ................. 327/170 |
| 2004/0130344 | A1 |   | 7/2004  | Rohrbaugh et al. ......... 324/763 |
| 2007/0053489 | A1 | * | 3/2007  | Lu et al. ....................... 378/62 |

* cited by examiner

*Primary Examiner*—Rexford N Barnie
*Assistant Examiner*—Crystal L Hammond
(74) *Attorney, Agent, or Firm*—ZPS Group, SC

(57) ABSTRACT

A method includes providing a bus, and providing a means for testing the bus for proper termination resistance during normal operation of the bus.

20 Claims, 2 Drawing Sheets

AUTOMATIC BUS MANAGEMENT

BACKGROUND OF THE INVENTION

This invention relates generally to differential communication protocols methods and apparatus, and more particularly to methods and apparatus that provide automatic bus monitoring and management.

Common differential communication protocols, such as RS-485 and CAN (Controller Area Network), require various serial and parallel termination resistances to ensure robust operation. When this resistance is incorrect, erratic system behavior can occur that can be very difficult to diagnose and fix.

It is known to measure termination resistance using a hand-held digital voltmeter, but this requires a powered-down system and human interaction. Thus, there is a long felt need for something that enables a system to report termination status automatically and remotely, and to operate intelligently in degraded modes, when applicable.

BRIEF DESCRIPTION OF THE INVENTION

In one aspect, a method includes providing a bus, and providing a means for testing the bus for proper termination resistance during normal operation of the bus.

In another aspect, a method includes providing a bus, monitoring the bus for proper termination resistance during normal operation of the bus, and shutting down the bus when the bus termination resistance is degraded past a predetermined amount.

In still another aspect, apparatus includes a bus, and a circuit operationally coupled to the bus and configured to monitor the bus for proper termination resistance during normal operation of the bus.

In yet another aspect, a diagnostic imaging system is provided. The system includes an x-ray source, an x-ray detector positioned to receive x-rays emitted from the source, a computer coupled to the source and detector, and a device controlled by the computer. The device including a CAN bus, and a circuit operationally coupled to the CAN bus and configured to monitor the CAN bus for proper termination resistance during normal operation of the CAN bus.

DETAILED DESCRIPTION OF THE INVENTION

There are herein described methods and apparatus useful for imaging systems such as, for example, but not limited to an x-ray system. The apparatus and methods are illustrated with reference to the figures wherein similar numbers indicate the same elements in all figures. Such figures are intended to be illustrative rather than limiting and are included herewith to facilitate explanation of an exemplary embodiment of the apparatus and methods of the invention. Although, described in the setting of an x-ray system, it is contemplated that the benefits of the invention accrue to all systems with x-ray sources. Additionally, although described in the diagnostic imaging setting, it is contemplated that the benefits of the invention accrue to any system having a bus.

Figure 1:
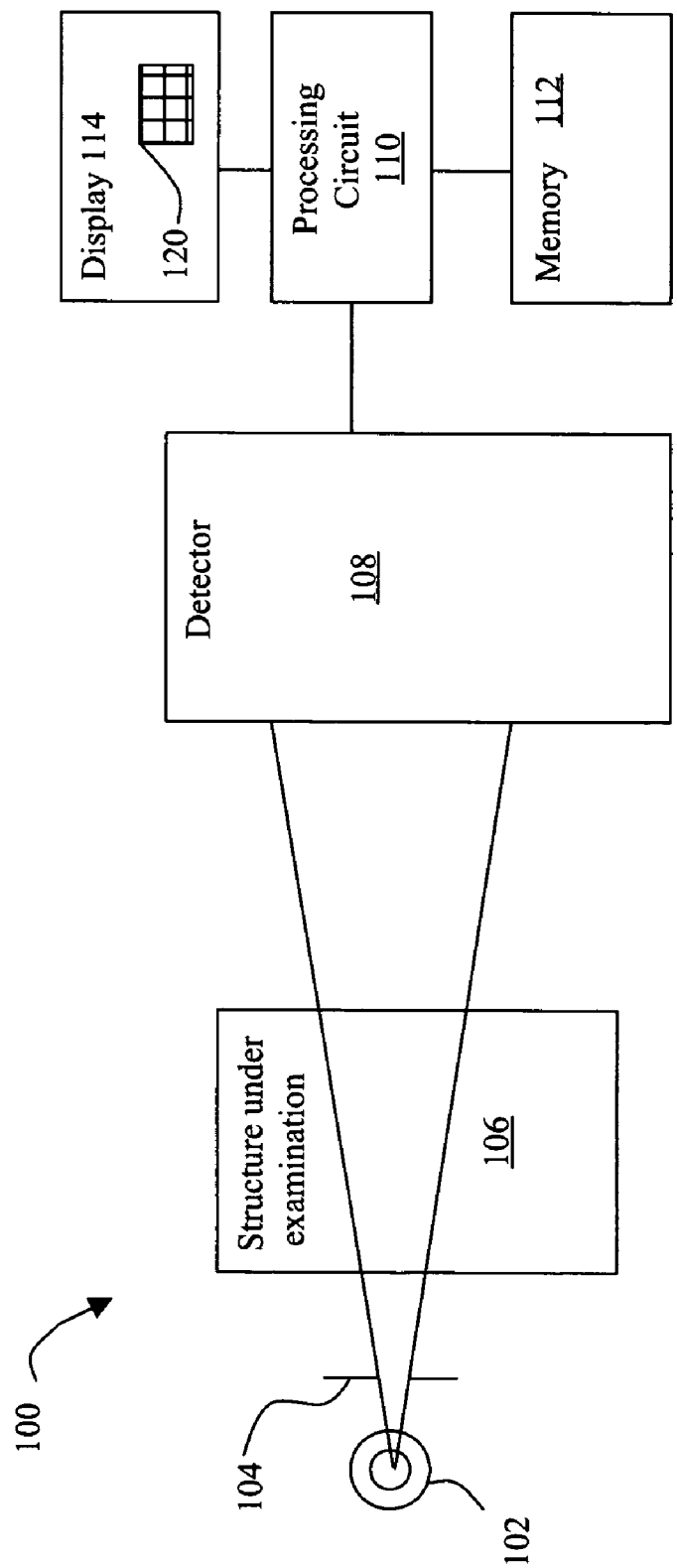
FIG. 1 illustrates an exemplary x-ray imaging system.

FIG. 1 illustrates an exemplary x-ray imaging system 100. The imaging system 100 includes an x-ray source 102 and a collimator 104, which subject the structure under examination 106 to x-ray photons. As examples, the x-ray source 102 may be an x-ray tube, and the structure under examination 106 may be a human patient, test phantom or other inanimate object under test.

The x-ray imaging system 100 also includes a detector 108 coupled to a processing circuit 110. The processing circuit 110 (e.g., a microcontroller, microprocessor, custom ASIC, or the like) is coupled to a memory 112 and a display device 114. The memory 112 (e.g., including one or more of a floppy disk drive, CD-ROM drive, DVD drive, magnetic optical disk (MOD) device, or any other digital device including a network connecting device such as an Ethernet device for reading instructions and/or data from a computer-readable medium, such as a floppy disk, or an other digital source such as a network or the Internet, as well as yet to be developed digital means, and the like) stores imaging data.

Memory 112 may also store a computer program including instructions executed by the processing circuit 110 to implement the functions described herein. Processing circuit 110 provides an image 120 for display on device 114. As described in further detail herein, the image 120 may representative of different structures (e.g., soft-tissue, bone). The detector 108 may be a flat panel solid state image detector, for example, although conventional film images stored in digital form in the memory 112 may also be processed. In one embodiment, processing circuit 110 executes instructions stored in firmware (not shown). Generally, a processor is programmed to execute the processes described below.

Of course, the methods described herein are not limited to practice in system 100 and can be utilized in connection with many other types and variations of imaging systems. In one embodiment, processing circuit 110 is a computer that is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Although the herein described methods are described in a human patient setting, it is contemplated that the benefits of the invention accrue to non-human imaging systems such as those systems typically employed in small animal research.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also, as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Although the herein described methods are described in a medical setting, it is contemplated that the benefits of the invention accrue to non-medical imaging systems such as those systems typically employed in an industrial setting or a transportation setting, such as, for example, but not limited to, a baggage scanning system for an airport or other transportation center.

Figure 2:
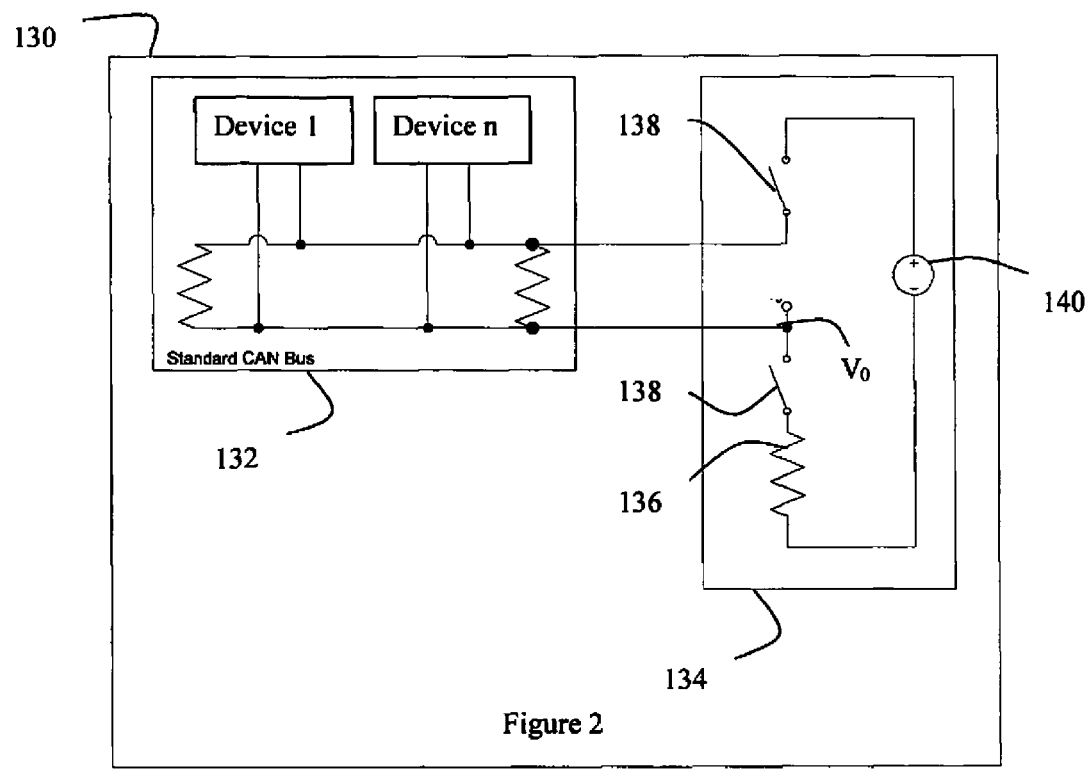
FIG. 2 illustrates apparatus incorporating a method of in-system testing for proper termination resistance of a bus before or during normal operation of the bus.

FIG. 2 illustrates apparatus incorporating a method of in-system testing for proper termination resistance of a bus before or during normal operation of the bus. Using this method, a static voltage is placed across the differential signals and a test resistor 136, which creates a voltage divider. The output of this voltage divider is measured and converted to a resistance based on a simple equation. During the test, all components on the bus (e.g., Devices 1 . . . n) are set to an in-active state so as not to interfere with the test, or to be confused by it. The herein described methods and apparatus are not specific to x-ray or medical equipment, and could be adapted to any differential communication scheme, parallel or serial.

FIG. 2 shows apparatus 130 including a bus 132 and a circuit 134 operationally coupled to the bus 132 and configured to monitor the bus 132 for proper termination resistance during normal operation of the bus 132. Circuit 134, in one embodiment, includes a resistive element 136 and a plurality of switches 138. A DC power source 140 provides power. DC power source 140 can be any type of source such as a logic gate, a transistor, or a traditional power supply. The switches 138 can be any type of switching device such as a relay or any other type of mechanical switch or an electronic switch such as a transistor or opto-isolater. $V_O$ can be sent to a test point, an analog circuit, or a digital measurement circuit (ADC). As shown in FIG. 2 with the leftmost resistor as $R_1$, the rightmost resistor as $R_3$, and the center resistor as $R_2$, the bus termination resistance is $R_1//R_2=R_3(DC/V_O-1)$. Of course, other formulas would be used for other circuits 134. Bus 132 may be in system 100 or under control of system 100 and in both instances be a "diagnostic imaging system bus," as used herein.

One advantage is system self-health monitoring and diagnosis. Using this method, the system can report to the user or to other components that the communication medium has a termination flaw, and specifically what the flaw is (under/over terminated and/or the value). Without this method, the system may report intermittent and perhaps unreasonable errors. If the termination is so bad as to completely inhibit communication, the bus can be completely turned off. Another benefit of this method is that it can be used to detect a low-resistance condition (a short) between the applied voltage and the differential signal. This is especially useful for detecting shorts to ground. Since this is an automated solution, the results of the termination test can be transmitted to remote facilities via modem, wireless mediums, broadband connections, Ethernet, etc. This would allow service personnel to be aware of potential system problems before arriving to fix it, or even receiving a service call.

One technical effect is that the herein described methods and apparatus is system self-health monitoring and diagnosis. FIG. 2 is novel due to its automated nature. It was common to measure termination resistance using a hand-held digital voltmeter, but this requires a powered-down system and human interaction. The herein described methods and apparatus enable the system to report termination status automatically and remotely, and to operate intelligently in degraded modes, when applicable.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. An imaging system comprising:
an x-ray source configured to project a beam of x-rays toward an object to be scanned;
a detector configured to detect x-rays energy passing through the object;
a computer connected to the detector and configured to receive a detector output and reconstruct an image of the object from the detector output; and
a bus controlled by the computer and configured to allow communication between a pair of devices; and
a test circuit coupled to the bus and configured to monitor a termination resistance of the bus during operation of the bus, the test circuit comprising:
a voltage source configured to generate a static test voltage;
a test resistor coupled to the voltage source;
a pair of switches coupled to the voltage source and configured to couple the voltage source to the bus, the bus being coupled in series between the pair of switches; and
a test point coupled to the test resistor and configured to indicate a voltage in the test circuit.

2. The imaging system of claim 1 wherein the test circuit monitors a voltage at the test point.

3. The imaging system of claim 1 being configured to determine the termination resistance of the bus according to:

$$R_1 \| R_2 = R_3(DC/V_0-1),$$

where $R_1 \| R_2$ is the termination resistance value of the bus, $R_3$ is the resistance value of the test resistor, DC is a static test voltage level of the voltage source, and $V_0$ is a voltage level of the voltage at the test point.

4. The imaging system of claim 1 wherein the bus comprises a controller area network (CAN) bus.

5. The imaging system of claim 1 wherein the voltage source comprises a DC voltage source.

6. The imaging system of claim 1 wherein each of the pair of switches comprises one of a transistor and an opto-isolator.

7. The imaging system of claim 1 wherein the test circuit comprises one of an analog circuit and a digital measurement circuit.

8. The imaging system of claim 1 wherein the test circuit is configured to monitor the termination resistance of the bus in an automated fashion.

9. The imaging system of claim 1 being configured to identify a termination flaw in the bus based on the determined termination resistance of the bus, the termination flaw comprising one of an over termination state and an under termination state of the bus.

10. The imaging system of claim 1 being configured to:
determine if the termination flaw completely inhibits communication of the bus; and
turn off the bus if the termination flaw completely inhibits communication of the bus;
otherwise, operate the bus in a degraded mode.

11. The imaging system of claim 1 being configured to detect a low-resistance condition based on the determined termination resistance of the bus.

12. The imaging system of claim 1 being configured to wirelessly transmit the results of the termination test to a remote location.

13. An imaging system comprising:
an x-ray source configured to project a beam of x-rays toward an object to be scanned;
a detector configured to detect x-rays energy passing through the object; and a computer connected to the detector and configured to receive a detector output and reconstruct an image of the object from the detector output; and a controller area network (CAN) bus controlled by the computer and configured to allow communication between a pair of devices; and a test circuit operationally coupled to the bus and configured to monitor a termination resistance of the bus during operation of the bus, the test circuit further comprising:

a voltage source configured to generate a static test voltage;

a test resistor coupled to the voltage source;

a pair of switches coupled to the voltage source and configured to couple the voltage source to the bus; and a test point coupled to the test resistor and configured to indicate a voltage in the test circuit;

wherein the computer is configured to determine the termination resistance of the CAN bus based on the static test voltage, a voltage at the test point, and a resistance value of the test resistor.

14. The imaging system of claim 13 wherein the computer is configured to determine the termination resistance of the CAN bus according to:

$$R_1 \| R_2 = R_3(DC/V_0 - 1),$$

where $R_1 \| R_2$ is the termination resistance value of the bus, $R_3$ is the resistance value of the test resistor, DC is a static test voltage level of the voltage source, and $V_0$ is a voltage level of the voltage at the test point.

15. The imaging system of claim 13 wherein the computer is configured to identify a termination flaw in the CAN bus based on the determined termination resistance of the CAN bus, the termination flaw comprising one of an over termination state and an under termination state of the bus.

16. The imaging system of claim 13 wherein the computer is configured to:

turn off the CAN bus if the termination flaw is outside a pre-determined range; and operate the bus in a degraded mode if the termination flaw is within the pre-determined range.

17. A method for determining a termination resistance of an imaging system bus comprising:

generating a static test voltage from a voltage source;

providing the test voltage across differential signals of an imaging system bus and across a test resistor, thereby providing a voltage divider;

measuring an output of the voltage divider;

converting the output of the voltage divider to a resistance value; and determining a termination resistance of the imaging system bus based on the resistance value;

wherein determining the termination resistance of the imaging system bus comprises determining the termination resistance according to:

$$R_1 \| R_2 = R_3(DC/V_0 - 1),$$

where $R_1 \| R_2$ is the termination resistance value of the bus, $R_3$ is the resistance value of the test resistor, DC is a static test voltage level of the voltage source, and $V_0$ is a voltage level of the voltage at the test point.

18. The method of claim 17 further comprising monitoring a value of the termination resistance of the imaging system bus.

19. The method of claim 18 further comprising:

identifying a termination flaw in the imaging system bus based on the monitored termination resistance, the termination flaw comprising one of an over termination state and an under termination state of the bus;

determining if the termination flaw completely inhibits communication of the bus; and turning off the bus if the termination flaw completely inhibits communication of the bus; and operating the bus in a degraded mode bus if the termination flaw does not completely inhibit communication of the bus.

20. A method for determining a termination resistance of an imaging system bus comprising:

generating a static test voltage from a voltage source;

providing the test voltage across differential signals of an imaging system bus and across a test resistor, thereby providing a voltage divider;

measuring an output of the voltage divider;

converting the output of the voltage divider to a resistance value;

determining a termination resistance of the imaging system bus based on the resistance value;

monitoring a value of the termination resistance of the imaging system bus;

identifying a termination flaw in the imaging system bus based on the monitored termination resistance, the termination flaw comprising one of an over termination state and an under termination state of the bus;

determining if the termination flaw completely inhibits communication of the bus; and turning off the bus if the termination flaw completely inhibits communication of the bus; and operating the bus in a degraded mode bus if the termination flaw does not completely inhibit communication of the bus.

* * * * *